April 3, 1934.  W. A. LEWIS  1,953,116
PILOT WIRE PROTECTION
Filed Jan. 6, 1933
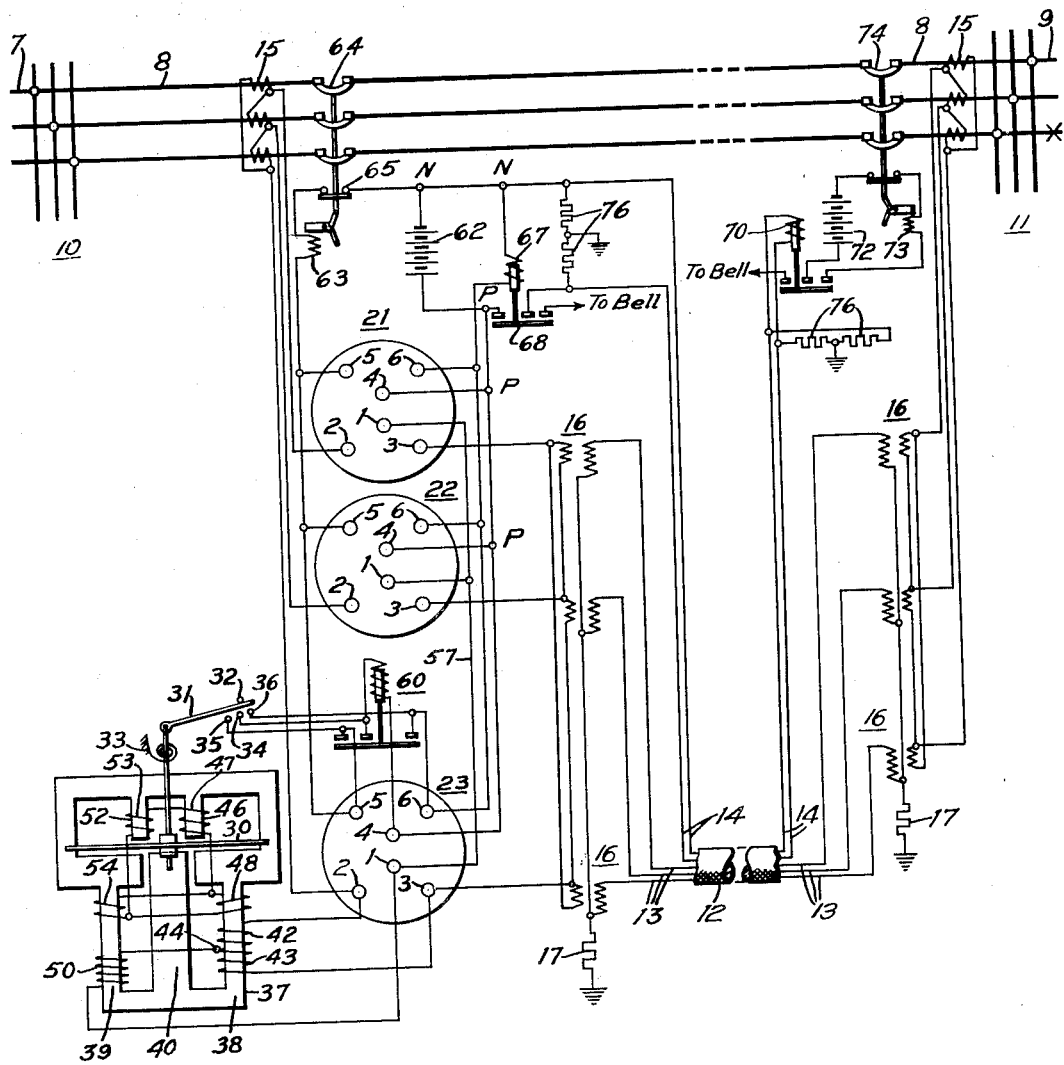
WITNESSES:
INVENTOR
William A. Lewis
BY
ATTORNEY Patented Apr. 3, 1934

1,953,116

UNITED STATES PATENT OFFICE 1,953,116

PILOT-WIRE PROTECTION

William A. Lewis, Wilkinsburg, Pa., assignor to Westinghouse Electric & Manufacturing Company, East Pittsburgh, Pa., a corporation of Pennsylvania Application January 6, 1933, Serial No. 650,518

18 Claims. (Cl. 175—294)

My invention relates to pilot-wire systems for protecting three-phase transmission lines against faults, and it has special relation to a simple means for overcoming the inaccuracies of many pilot-wire systems utilized heretofore.

Pilot wires are usually placed in a cable paralleling the right of way of the transmission line, and are subject to rather large induced currents, particularly when there is a fault on the transmission line which is to be protected by the pilot wires. The voltage induced in such a pilot-wire circuit will practically all be of zero phase-sequence, that is, the induced currents will all be in phase with each other and will all flow in the same direction in all of the pilot wires.

Such pilot-wire circuits have been heretofore utilized in balanced-current protection systems, for balancing the currents at the two ends of a line-section to be protected, so that any unbalance of the currents entering and leaving any particular line-section will indicate the existence of a fault somewhere within the line-section.

It will be perceived, from the foregoing, that it is impractical to balance the zero-sequence components of the line-currents by means of pilot wires, because of the existence of the large induced zero-sequence voltages in the pilot wires themselves. In accordance with my invention, I utilize what I term a rotational phase-sequence current-quantity, that is, a polyphase quantity containing no zero-sequence currents, but being made up altogether of symmetrical components of the rotating phase-sequence variety, that is, positive phase-sequence currents or negative phase-sequence currents, or any currents derived from a combination of both. Thus, I am able to drain the induced zero-phase-sequence currents from the pilot wires, without affecting the relaying currents, at the two ends of the line-section, which are to be compared with each other by means of the pilot-wire circuits.

With the foregoing and other objects in view, my invention consists of the apparatus and systems hereinafter described and claimed and illustrated in the accompanying drawing, the single figure of which is a diagrammatic view of circuits and apparatus embodying my invention in a preferred form.

My invention is shown as being applied to a three-phase transmission line comprising, for example, three serially connected line-sections 7, 8 and 9, separated by two distant relaying stations 10 and 11. The two relaying stations are connected by a pilot-wire cable 12 which is shown as containing at least five pilot wires, of which three pilot wires 13 constitute a three-phase circuit for transmitting polyphase relaying currents from one end of the line-section 8 to the other, and two pilot wires 14 constitute an additional pilot-wire circuit for a purpose to be mentioned later on.

It is important, in practicing my invention, to utilize a source of relaying currents which contains none of the zero-phase-sequence components. There are a number of means available for deriving such currents from a polyphase line. For purposes of illustration, I have shown line current transformers 15 which are connected in delta, so that the zero-phase-sequence currents circulate around the delta circuit and are thus kept out of the relaying circuits.

It is also important, in practicing my invention, to so couple this source of relaying current to the three-phase pilot-wire circuit 13 as to drain off the zero-sequence current which flows in the pilot wires as a result of induction from a fault-current in the transmission line, while retaining intact the positive and negative sequence components which are to be transmitted from one end of the pilot-wire circuit to the other. There are several transformer connections available for accomplishing this purpose. One of them is a delta-star transformer connection, with the star point grounded, the star-connected transformer windings being connected to the pilot wires, and the delta-connected transformer windings being connected to the relay-current sources. Such a transformer connection is shown at 16 in the drawing. The ground connections of the star points of the two sets of coupling transformers 16 are completed through resistors 17 at each end of the pilot wire, the value of the resistance being proportioned to keep the drainage current within the allowable limits of the carrying capacities of the pilot wires, and also to keep the voltage between the coupling transformers and ground within the limits of their insulation and also within the limits of safety to the operators. The coupling transformers 16 are of the current-transformer type and are arranged to step down the current to be impressed on the pilot wires, in order to reduce the burden on the instrument transformers 15.

The delta-connected terminals of the coupling transformers 16 at the station 10 are connected to three differential relays 21, 22 and 23 which serve to compare the pilot-wire currents with the relaying currents which are delivered by the delta-connected line-current transformers 15 at the said station 10.

The differential relays 21 to 23 are all alike, so that a description of one will suffice for all. Any suitable type of differential relay may be utilized but certain advantages may be obtained by utilizing the type which I have shown in detail in connection with the relay 23.

The relay 23 has six terminal binding posts numbered 1 to 6, respectively. In its internal construction, it consists of an induction-disc type of relay having two opposed torque-producing circuits. Thus, it consists of a rotatably-mounted copper disc 30 carrying a contact-making member 31 which is normally held back against a stop 32 by means of a spring 33. When the relay disc 30 is rotated, the contact member 31 makes contact across three stationary contact members 34, 35 and 36.

The disc 30 is operated upon by a duplex magnetic circuit which is provided by means of punchings 37, having two outer limbs 38 and 39 and a common central limb 40. One of the outer limbs, as shown at 38, is provided with two serially connected windings 42 and 43 having a common junction point 44. The terminals of these windings are connected respectively to the binding posts 2 and 3 of the relay, and these binding posts are connected, in turn, to the line current transformers 15 and the pilot-wire coupling transformers 16, respectively. The magnetic fluxes developed by the exciting windings 42 and 43 on the limb 38 of the magnetic circuit are transmitted to the under side of the disc 30 from the tops of the limbs 38 and 40 of the magnetic circuit. Rotation of the disc 30, in a contact-opening direction, as a result of the alternating flux produced by the coils 42 and 43, is effected by means of an upper pole-piece 46 which is displaced spatially with respect to the lower pole-pieces constituted by the upper ends of the limbs 38 and 40. The upper pole-piece 46 is energized by a field winding or coil 47 which is connected to receive current from a transformer winding 48 which is wound on the limb 38.

The relay disc 30 is moved in a direction to close its contacts by means of torque produced by the energization of a so-called difference coil 50 which is mounted on the other outer limb of the magnetic circuit, as indicated at 39. The energization of this coil produces a magnetic flux which is transmitted to the under side of the disc 30 from the tops of the limbs 39 and 40 of the magnetic circuit 37. Cooperating therewith is an upper pole-piece 52 which is displaced spatially with respect to the pole-pieces constituted by the upper ends of the limbs 39 and 40, and which is energized by means of a coil 53 which receives electric current from a transformer winding 54 mounted on the limb 39. The two transformer windings 48 and 54, on the limbs 38 and 39 respectively, are in fact connected in series, and the two upper-pole coils 47 and 52 are also connected in series.

The coil 50 on the limb 39 of the relay frame 37 has one terminal connected to the intermediate or common terminal 44 of the two coils 42 and 43, with its other terminal connected to the binding post 1 of the relay 23, said binding post being also connected to a neutral or star circuit 57.

It will be understood that the three relays 21, 22 and 23 are connected in the three phases of the polyphase relay currents, respectively, as shown in the drawing. The difference coil 50 is energized in accordance with the difference between the currents to be compared, whereas the other coils 42 and 43, called the "sum" coils, are energized respectively by the currents between which the comparison is to be made.

The operation of relay 23 is as follows. If a fault occurs outside of the line-section 8 being protected, as indicated at X in the adjoining line-section 9, the fault current will be the same in magnitude and direction at both ends of the line-section 8, so that only the sum coils 42 and 43 will be energized, thus holding the relay rotor against its back stop 32. However, if the fault occurs in the line-section itself, the currents at the two ends will be in opposite directions, so that the fluxes of the two sum coils 42 and 43 will oppose each other, thus very materially reducing the restraining torque on the relay disc 30. At the same time the difference coil 50 will be strongly energized, in accordance with the vectorial difference between the two currents, which amounts substantially to the numerical sum of them, since they are in substantial phase-opposition, thus developing a closing torque which closes the relay contacts 34, 35 and 36. These contacts are connected to the respective relay terminals 4, 5 and 6, by means of which the necessary control operations may be effected, as will shortly be pointed out. In order to avoid the danger of fusing of the relay contacts 34, 35 and 36, it is usual to bridge the same by means of a contactor 60, the operating coil of which is connected in series with the contact member 34, between said contact member and the terminal member 4, so that, as soon as the contacts 34, 35 and 36 are closed, the contactor 60 picks up, bridging the same, and holding itself closed until the circuit is broken by external means, as will now be described.

The terminal binding posts 4 of the three differential relays 21, 22 and 23 are all connected to the positive terminal P of a battery or other source 62. The terminal binding posts 5 of the three differential relays are all connected to the tripping coil 63 of a circuit breaker 64 in the line-section 8 at the station 10. The trip-coil circuit is completed through auxiliary contacts 65 carried by the circuit breaker, thus completing the circuit to the negative terminal N of the battery 62. When the main circuit-breaker contacts are open, the auxiliary contacts 65 also open, thus interrupting the heavy tripping current in the trip coil 63, and so far reducing the energization of the contactor 60 as to cause its contacts to open.

The terminal binding posts 6 of the differential relays are all connected to one terminal of the operating coil 67 of an auxiliary relay 68, the other terminal of the operating coil 67 being connected to the negative terminal N of the battery 62.

The main purpose of the auxiliary relay 68 is to transmit a tripping signal to the other end of the line-section 8, that is, to the station 11. This tripping signal may be either the establishment of a pilot-wire circuit or an interruption thereof, and I desire the term "tripping signal" to be construed broadly to cover either alternative. In accordance with the particular system shown in the drawing, the auxiliary pilot-wire circuit 14 is established by means of the auxiliary relay 68, which completes a circuit from the positive terminal P and the negative terminal N of the battery 62, thus applying potential to the two wires of the auxiliary pilot circuit 14.

At the far end of the line-section 8, the auxiliary pilot wires 14, thus energized, cause the operation of a relay 70. The receiving relay 70 operates to complete a tripping circuit, as from a local battery 72, for the tripping coil 73 of a circuit breaker 74 at the end of the line-section 8 at the station 11.

The auxiliary pilot-lines 14, which are used for tripping purposes, are, of course, also subject to induction, and so I provide, at each end, a drainage resistor 76, the mid-point of which is grounded, so as to drain off the current due to induction and limit the voltages appearing on the auxiliary pilot wires.

The use of the auxiliary pilot-wire circuit 14 is advantageous, not only for economical reasons, which are due to the fact that the addition of the two auxiliary trip wires 14 to the cable represent a smaller investment than the duplication of the balancing relays at the other end 11 of the line-section 8, but also for special reasons which are due to the greater sensitivity which can be obtained by causing the available current-difference to operate only one set of relays instead of having to operate two sets of relays, as would be the case if the relays 21, 22 and 23 of station 10 were duplicated at station 11.

While my auxiliary tripping circuit 14 is thus believed to present certain advantages, I desire it to be understood that my invention, in its broader aspects, is not limited to any particular means for securing a differential current response at each end of the pilot-wire cable 12 for tripping the respective circuit breakers 64 and 74.

In like manner, while the particular type of differential relay which I have illustrated at 23 and described above, is believed to be particularly advantageous, it is to be understood that, in its broader aspects, my invention is not limited to any particular type of mechanism for effecting the comparison between the relaying currents. One of the advantages of the particular differential relay illustrated, is that it responds to a predetermined percentage difference between the currents at the two ends of the line-section, as distinguished from responding to a predetermined numerical difference between the currents. This is brought about by causing an operating torque to be produced in accordance with the difference between the currents, and a restraining torque to be produced in accordance with the sum of the currents. Thus, when the current in the lines is excessively large, as in the event of a fault, at which time the line-current transformers 15 may not preserve their exact current-ratios, the particular differential relays which I have illustrated will require a larger unbalance in current to operate them, than when normal current is flowing in the line-section. This feature is desirable as it allows the differential relays to operate more readily on a small current, which may be produced by a ground fault, while reducing the likelihood of false operation due to the errors introduced into the line-current transformer secondary currents by a large short-circuit current in the event of a through fault in another section.

I claim as my invention:

1. Protective means for a three-phase transmission line having two distant relaying stations at opposite ends of a line-section thereof, pilot wires between said stations, line-current-responsive relay-current means at each station for deriving, for relaying purposes, corresponding rotational phase-sequence current-quantities, containing no zero-sequence currents, means for impressing said quantities at opposite ends of a plurality of said pilot wires, means for draining induced zero-sequence currents from said pilot wires, and means responsive to a predetermined condition of unbalance between said quantities at opposite ends of the line-section for clearing said line-section.

2. Protective means for a three-phase transmission line having two distant relaying stations at opposite ends of a line-section thereof, pilot wires between said stations, line-current-responsive relay-current means at each station for deriving, for relaying purposes, corresponding rotational phase-sequence current-quantities containing no zero-sequence currents, transformer means for so coupling said relay-current means to the opposite ends of a plurality of said pilot wires that no zero-sequence currents can be transmitted from the pilot wires to the relay-current means, and means responsive to a predetermined condition of unbalance between said quantities at opposite ends of the line-section for clearing said line-section.

3. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, means for impressing said three-phase relaying currents at opposite ends of a plurality of said pilot wires, means for draining induced zero-sequence currents from said pilot wires, and means responsive to a predetermined condition of unbalance between said relaying currents at opposite ends of the line-section for clearing said line-section.

4. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, a set of current-transformers for impressing said three-phase relaying currents at opposite ends of three pilot wires, said current-transformers being connected in grounded-neutral star on the pilot-wire side, and being so connected on the relay-station side as to prevent the transmission thereto of zero-sequence currents from said pilot wires, and means responsive to a predetermined condition of unbalance between said relaying currents at opposite ends of the line-section for clearing said line-section.

5. Protective means for a three-phase transmission line having two distant relaying stations at opposite ends of a line-section thereof, pilot wires between said stations, line-current-responsive relay current means at each station for deriving corresponding three-phase relaying currents containing positive and negative phase-sequence current-components but no zero phase-sequence current-components, transformer means for so coupling said relay-current means to the opposite ends of a plurality of said pilot wires that no zero-sequence currents can be transmitted from the pilot wires to the relay-current means, and means responsive to a predetermined condition of unbalance between said relaying currents at opposite ends of the line-section for clearing said line-section.

6. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, transformer means for so coupling said relay-current means to the opposite ends of a plurality of said pilot wires that no zero-sequence currents can be transmitted from the pilot wires to the relay-current means, means for draining induced zero-sequence currents from said pilot wires, and means responsive to a predetermined condition of unbalance between said relaying currents at opposite ends of the line-section for clearing said line-section.

7. Protective means for a three-phase transmission line having two distant relaying stations at opposite ends of a line-section thereof, a three-phase pilot-wire circuit between said stations, line-current-responsive relay-current means at each station for deriving corresponding three-phase relaying currents containing positive and negative phase-sequence current-components but no zero phase-sequence current-components, a transformer connection, at each end of the pilot-wire circuit, between the pilot wires and the relay-current means, said transformer connection being of a type which will drain off the zero-sequence current which flows in the pilot wires as a result of induction from a fault-current in the transmission line, but retains intact the positive and negative sequence components being transmitted from one end of the pilot-wire circuit to the other, and means responsive to a predetermined condition of unbalance between said relaying currents at opposite ends of the line-section for clearing said line-section.

8. Protective means for a three-phase transmission line having two distant relaying stations at opposite ends of a line-section thereof, line-current-responsive relay-current means at each station for deriving, for relaying purposes, corresponding rotational phase-sequence current-quantities containing no zero-sequence currents, a relay-purpose communication channel between the two stations, means for feeding at least one of said quantities into and out of opposite ends of the communication channel, and means responsive to a predetermined condition of unbalance between said quantities at opposite ends of the line-section for clearing said line-section.

9. Protective means for a three-phase transmission line having two distant relaying stations at opposite ends of a line-section thereof, line-current responsive relay-current means at each station for deriving corresponding three-phase relaying currents containing positive and negative phase-sequence current-components but no zero-phase-sequence current-components, a relay-purpose communication channel between the two stations, means for feeding at least one of said three-phase relaying currents into and out of opposite ends of the communication channel, and means responsive to a predetermined condition of unbalance between said relaying currents at opposite ends of the line-section for clearing said line-section.

10. Protective means for a three-phase transmission line having two distant relaying stations at opposite ends of a line-section thereof, pilot wires between said stations, line-current-responsive relay-current means at each station for deriving, for relaying purposes, corresponding rotational phase-sequence current-quantities containing no zero-sequence currents, means for impressing said quantities at opposite ends of a plurality of said pilot wires, means for draining induced zero-sequence currents from said pilot wires, and means responsive to a predetermined condition of unbalance between said quantities at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

11. Protective means for a three-phase transmission line having two distant relaying stations at opposite ends of a line-section thereof, pilot wires between said stations, line-current-responsive relay-current means at each station for deriving, for relaying purposes, corresponding rotational phase-sequence current-quantities containing no zero-sequence currents, transformer means for so coupling said relay-current means to the opposite ends of a plurality of said pilot wires that no zero-sequence currents can be transmitted from the pilot wires to the relay-current means, and means responsive to a predetermined condition of unbalance between said quantities at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

12. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current components, means for impressing said three-phase relaying currents at opposite ends of a plurality of said pilot wires, means for draining induced zero-sequence currents from said pilot wires, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

13. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, a set of current-transformers for impressing said three-phase relaying currents at opposite ends of three pilot wires, said current-transformers being connected in grounded-neutral star on the pilot-wire side, and being so connected on the relay-station side as to prevent the transmission thereto of zero-sequence currents from said pilot wires, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

14. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, transformer means for so coupling said relay-current means to the opposite ends of a plurality of pilot wires that no zero-sequence currents can be transmitted from the pilot wires to the relay-current means, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

15. Protective means for a three-phase transmission line having two distant relaying stations at opposite ends of a line-section thereof, pilot wires between said stations, line-current-responsive relay-current means at each station for deriving corresponding three-phase relaying currents containing positive and negative phase-sequence current-components but no zero phase-sequence current-components, transformer means for so coupling said relay-current means to the opposite ends of a plurality of pilot wires that no zero-sequence currents can be transmitted from the pilot wires to the relay-current means, means for draining induced zero-sequence currents from said pilot wires, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through other pilot wires, a tripping signal to the other end of the line-section, and means at said other end for responding to said tripping signal to clear said end of the line-section.

16. Protective means for a three-phase transmission line having two distant relaying stations at opposite ends of a line-section thereof, a three-phase pilot wire circuit and another pilot-wire circuit between said stations, line-current-responsive relay-current means at each station for deriving corresponding three-phase relaying currents containing positive and negative phase-sequence current-components but no zero phase-sequence current-components, a transformer connection, at each end of the three-phase pilot-wire circuit, between said three-phase pilot wires and the relay-current means, said transformer connection being of a type which will drain off the zero-sequence curent which flows in said pilot wires as a result of induction from a fault-current in the transmission line, but retains intact the positive and negative sequence components being transmitted from one end of said pilot-wire circuit to the other, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through said other pilot-wire circuit, a tripping signal to the other end of the line-section, and means at said other end for responding to said tripping signal to clear said end of the line-section.

17. Protective means for a three-phase transmission line having two distant relaying stations at opposite ends of a line-section thereof, line-current-responsive relay-current means at each station for deriving, for relaying purposes, corresponding rotational phase-sequence current-quantities containing no zero-sequence currents, a plurality of relay-purpose communication channels between the two stations, means for feeding at least one of said quantities into and out of opposite ends of one of said communication channels, and means responsive to a predetermined condition of unbalance between said quantities at opposite ends of the line-section for clearing said line-section, said last-mentioned means comprising differential relaying means at one station, means responsive thereto for clearing its own end of the line-section and for transmitting, through another of said communication channels, a tripping signal to the other end of the line-section, and means at said other end for responding to said tripping signal to clear said end of the line-section.

18. Protective means for a three-phase transmission line having two distant relaying stations at opposite ends of a line-section thereof, line-current-responsive relay-current means at each station for deriving corresponding three-phase relaying currents containing positive and negative phase-sequence current-components but no zero phase-sequence current-components, a plurality of relay-purpose communication channels between the two stations, means for feeding at least one of said three-phase relaying currents into and out of opposite ends of one of said communication channels, and means responsive to a predetermined condition of unbalance between said relaying currents at opposite ends of the line-section for clearing said line-section, said last-mentioned means comprising differential relaying means at one station, means responsive thereto for clearing its own end of the line-section and for transmitting, through another of said communicating channels, a tripping signal to the other end of the line-section, and means at said other end for responding to said tripping signal to clear said end of the line-section.

WILLIAM A. LEWIS.